(12) United States Patent
Karlsen et al.

(10) Patent No.: US 7,697,553 B2
(45) Date of Patent: Apr. 13, 2010

(54) METHOD FOR MANAGING VARIATION IN A DATA FLOW RATE

(75) Inventors: Per Arne Karlsen, Trollasen (NO); Olav Luraas Kalgraf, Oslo (NO)

(73) Assignee: Tandberg Telecom AS, Lysaker (NO)

( * ) Notice: Subject to any disclaimer, the term of this patent is extended or adjusted under 35 U.S.C. 154(b) by 1728 days.

(21) Appl. No.: 10/850,362

(22) Filed: May 19, 2004

(65) Prior Publication Data
US 2005/0013312 A1 Jan. 20, 2005

(30) Foreign Application Priority Data
May 23, 2003 (NO) ................................. 20032342

(51) Int. Cl.
*H04L 12/28* (2006.01)
*H04L 12/56* (2006.01)
(52) U.S. Cl. .................. 370/412; 370/231; 370/235
(58) Field of Classification Search ................. 370/229, 370/231, 230, 235, 232, 233, 234, 252
See application file for complete search history.

(56) References Cited

U.S. PATENT DOCUMENTS

| | | | |
|---|---|---|---|
| 5,600,646 A | 2/1997 | Polomski | |
| 5,812,699 A | 9/1998 | Zhu et al. | |
| 6,065,131 A | 5/2000 | Andrews et al. | |
| 6,167,029 A * | 12/2000 | Ramakrishnan | 370/235 |
| 6,381,216 B1 * | 4/2002 | Prasad | 370/236.1 |
| 6,606,112 B1 | 8/2003 | Falco | |
| 6,657,954 B1 * | 12/2003 | Bird et al. | 370/229 |
| 6,831,893 B1 * | 12/2004 | Ben Nun et al. | 370/235 |
| 2001/0046209 A1 * | 11/2001 | Glassman | 370/230 |
| 2003/0012138 A1 * | 1/2003 | Abdelilah et al. | 370/231 |
| 2003/0028643 A1 * | 2/2003 | Jabri | 709/226 |
| 2003/0058836 A1 | 3/2003 | Even | |
| 2003/0074674 A1 | 4/2003 | Magliaro | |
| 2003/0117954 A1 * | 6/2003 | De Neve et al. | 370/230 |

FOREIGN PATENT DOCUMENTS

| | | |
|---|---|---|
| EP | 0 553 379 B1 | 5/1996 |
| JP | 2000-216819 | 8/2000 |
| WO | 02/085020 | 10/2002 |

OTHER PUBLICATIONS

Glasmann, J., et al., "Estimation of Token Bucket Parameters for Videoconferencing Systems in Corporate Networks," 1-10 (table of contents pp. i-iii).

Daisuke Morikawa, et al., "A study of Streaming Traffic Control Method in Best-Effort Mobile Packet Network", Research Bulletin of Information Processing Society of Japan, vol. 2002, No. 24, p. 161-168, issued on Mar. 8, 2002 (Partial English Translation).

* cited by examiner

*Primary Examiner*—Ricky Ngo
*Assistant Examiner*—David Oveissi
(74) *Attorney, Agent, or Firm*—Oblon, Spivak, McClelland, Maier & Neustadt, L.L.P.

(57) ABSTRACT

The present invention discloses a method of detecting overproduction of data when an H.323 endpoint is transmitting more video or other data than initially negotiated, and makes it produce less by utilizing standard flow control procedures. Flow control messages are sent periodically, incrementally instructing the H.323 endpoint to transmit lower amounts of bit rates, until the video rate received from the endpoint is equal to or lower than the initially negotiated rate, or some other fixed rate.

9 Claims, 1 Drawing Sheet

METHOD FOR MANAGING VARIATION IN A DATA FLOW RATE

RELATED APPLICATION

This application claims priority under 35 U.S.C. §119 or 365 to Norwegian Application No. 20032342, filed May 23, 2003. The entire teachings of the above application(s) are incorporated herein by reference.

BACKGROUND

Videoconferencing systems are conventionally adjusted to employ both circuit switched and packet switched networks. Thus, great efforts have been made to achieve interoperability between circuit switched and packet switched terminals allowing interactions and communication without loss of quality or introduction of delay. A common standard for multimedia communications over circuit switched networks like ISDN is the H.320 standard from the International Telecommunications Union (ITU). The corresponding standard for packet switching is the H.323 standard.

As already mentioned, H.323 is an umbrella recommendation from the International Telecommunications Union (ITU) that set standards for multimedia communications over packet switched networks that do not provide a guaranteed Quality of Service. Such networks are pervasive on many corporate terminals and include TCP/IP and IPX over Ethernet, Fast Ethernet and Token Ring network technologies. The H.323 standard, titled: Packet-Based Multimedia Communications Systems, provides a foundation for audio, video, and data communications across IP-based networks, including the Internet. Multimedia products and applications complying with the H.323 standard are interoperable, can communicate with each other, and thus are compatible. Many sub standards make up the H.323 standard or protocol, one of which is the H.245 standard.

The H.245 standard defines the control protocol part of the H.323 standard. According to this protocol, there are several ways of altering the flow rate during a call. The most robust way is to send a flowControlCommand to the transmitting terminal. The flowControlCommand includes the fields logicalChannelNumber and maximumBitRate. The maximumBitRate indicates maximum allowed bit rate for the logical channel. The message is not rejectable, i.e. a terminal is not allowed to transmit at a higher rate after receiving the message. The flowControlCommand is i.a. used for initially setting a negotiated maximum data rate between terminals. An alternative way of altering the bit rate is to use the Logical Channel bit rate message flow. For illustrative purposes, consider a gateway using the Logical Channel bit rate messages to alter a flow rate transmitted from an EndPoint. A LogicalChannelRateRequest message is transmitted from the Gateway to the EndPoint. The message includes a logicalChannelNumber indicating the logical channel that the bit rate change request applies to, in addition to a maximumBitrate indicating, in units of 100 bit/s, the requested maximum bit rate for the logical channel. The Endpoint approves and acknowledges the request for data rate change of the specified channel by returning a LogicalChannelRateAcknowledge message including the same parameters as in the previously received LogicalChannelRateRequest message. Alternatively, if the EndPoint for some reason does not accept the requested change, the LogicalChannelRateRequest message is responded by a LogicalChannelRateReject including rejectReason indicating the reason why the request was denied.

An alternative protocol to H.323 is the SIP (Session Initiation Protocol) protocol. In the current SIP standard, altering the flow rate during a call is carried out by transmitting a ReInvite message to the EndPoint. The ReInvite message carries the same information as the Invite message, including a so-called CapSet, which is used at call set up. Thus, the ReInvite message also includes maximum allowed bit rate, and consequently, transmitting a ReInvite message with a new maximum allowed data rate leaving the other data unchanged will have the same effect as the flowControlCommand in H.323.

A gateway provides a connection between the IP and the circuit switched side of the communication path between endpoints in a multimedia conference. Seen from the endpoints residing at the IP side, the endpoints at the circuit switched side are virtually being converted to IP endpoints, and vice versa. The main tasks of the gateway is consequently to translate and re-pack the data stream across the networks in real-time. The packets transmitted from the H.323 endpoints are temporarily stored in a buffer before they are fetched and arranged in H.320 frames of a fixed size.

The translation process from H.323 to H.320 in the gateway is accomplished by extracting raw video data from packets specified by RFC2032 (H.261 over RTP), RFC2190 (H.263 over RTP) and RFC 2429(H.263+ over RTP) and forwarding this raw data to a so-called BCH encoder.

When translating in the opposite direction from H.320 to H.323 the process is a lot more complex because the packetization schemes described in the RFC's mentioned above have strict rules about where a packet split may occur. Specifically packet splits are allowed at Picture, Group Of Block (GOB) and Macro Block (MB) level. It is most desirable to have splits occur at the Picture and GOB levels because a split on the MB level has some associated overhead due to the need to transmit some video decoder state information along with the video data.

A conventional implementation uses variable length decoding to determine the location and length of Groups Of Blocks (GOB) in the video stream. When it has found a GOB, it processes the corresponding bits by using the number of bits in the GOB (a), the number of available bits in the current packet (b) and the maximum packet size (c), to choose one of the following actions:

If a<=b, append the GOB to the current packet
If a>b and a<=c Transmit the current packet and append the GOB to a new packet
If a>b and a>c Transmit the current packet and transmit the GOB using less optimal macroblock level packetization.

These three rules optimize packetization to fit the entire GOB in a packet if possible while also combining several GOBs in one packet where possible. This is desirable because GOB aligned packets have less overhead and few large packets require less processing overhead than many small packets.

In addition to the above rules, packets are also transmitted when the last GOB in a picture is added to a packet. This additional rule prevents the gateway from accumulating unwanted delay.

H.323 endpoints and H.320 endpoints connected together in a gateway unit are not able to use end-to-end flow-control because the H.320 protocol does not support it. However, flow-control can be used between the gateway and the H.323 endpoint. Only the flow-control messages from the gateway to the H.323 endpoint will have any effect. A typical scenario e.g. in known H320/H323 Gateways from Polycom and Ezenia is that the gateway initially will send flow-control messages to the H.323 endpoint to adjust the video data rate produced to the available capacity in the outgoing H.320 connection from the gateway. It is not possible to flow control the H.320 endpoint because the H.320 protocol simply does not support this. This means that the H.320 could produce more video than the H.323 endpoint supports. Only the flow-control messages from the gateway to the H.323 endpoint will have any effect. The effect will depend on flow-control support in the H.323 endpoint.

A problem then occurs when the H.323 endpoint for some reason starts to transmit data to the gateway at a higher bit rate than initiated by the flow-control. This may occur because of defects in the endpoint, loss of data settings or a drifting or incorrect wall clock. The gateway will then not be able to capture data to H.320 frames as fast as the buffer is filled up. In the first instance, this implies increasingly larger delays in the data transmission because the payload will spend longer time in the buffer, which will be crucial to real-time applications like videoconferencing. Additionally, at some point, the upper fill limit of the buffer will be reached. When the upper fill limit is reached, the gateway has no other choice than to reject subsequent incoming data. The result of this is loss of data appearing for the user of the H.320 endpoint as i.a. picture artifacts.

SUMMARY

The present invention relates to flow control in videoconferencing systems.

The features defined in the independent claims enclosed characterize this arrangement and method.

In particular, the present invention discloses a method of adjusting a flow rate of data transmitted from a first packet switched H.323 or SIP configured video conference terminal and received in a second packet switched H.323 or SIP configured video conference terminal, temporarily storing the received data in one or more buffers in the second packet switched video conference terminal before being captured for further processing, the method further comprising the following steps, after each data capturing from said one or more buffers: comparing a fill level of the one or more buffers with a predefined level, if said fill level is lower than said predefined level, then resetting a counter, if said fill level is greater than said predefined level, then incrementing said counter, and comparing said counter with a predefined counter limit, if said counter is greater than said predefined counter limit, then resetting said counter, and decreasing the flow rate of the transmitted data by transmitting a flow control message from the second to the first packet switched terminal instructing the first packet switched terminal to decrease the flow rate according to a flow rate value included in said flow control message.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
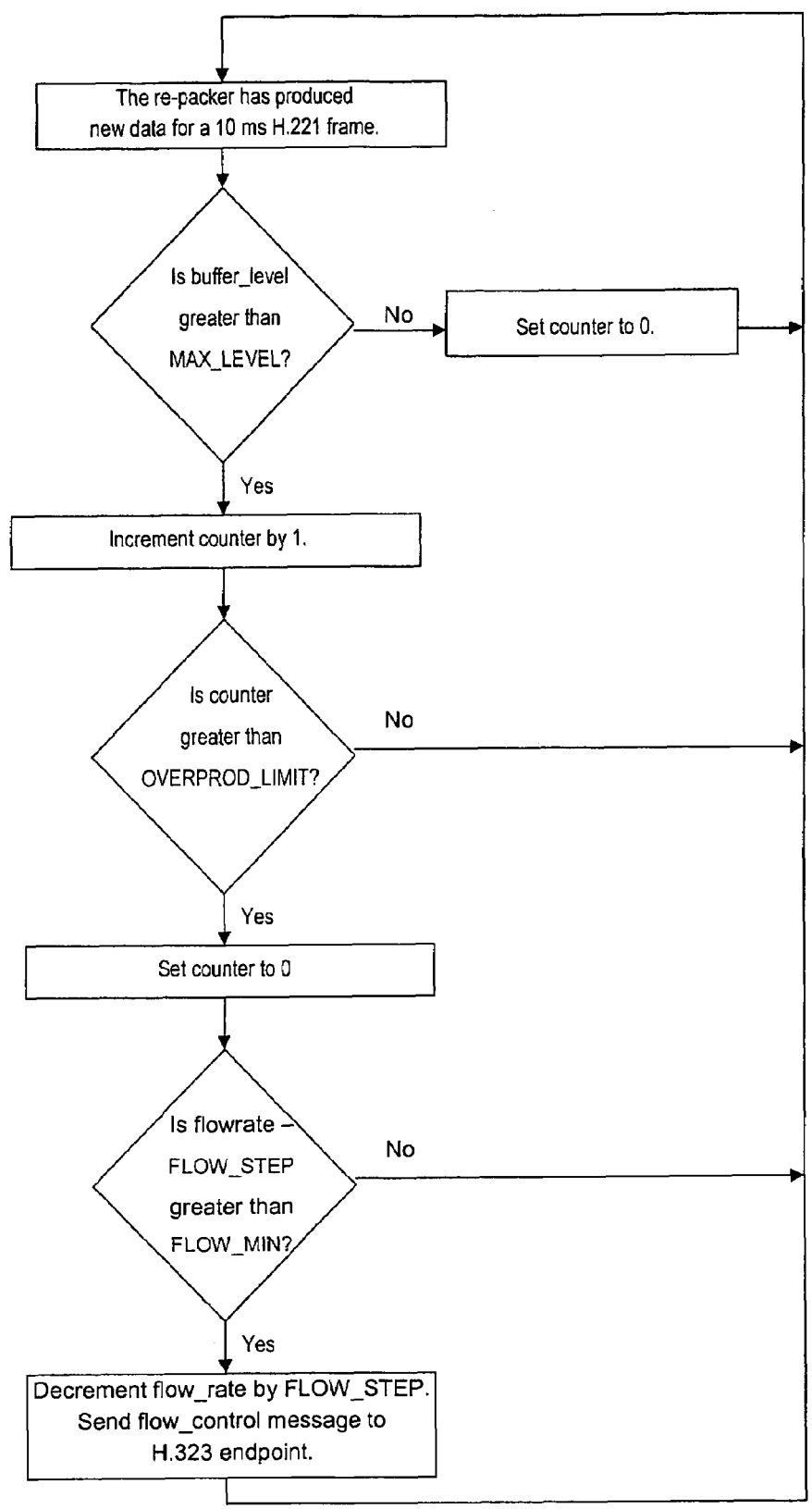
FIG. 1 is a flow sheet illustrating a preferred embodiment of the present invention.

The present invention provides automatic detection of overproduction of data when e.g. an H.323 endpoint is transmitting more video or other data than what initially was negotiated, and make it produce less by utilizing the above described message flow for data rate changes or other flow control mechanisms. In the case of H.323, flowControlCommand or LogicalChannelRateRequest messages are periodically transmitted to the endpoint in question with incrementally lower amounts of maximumBitrate, until the video rate received from the endpoint is equal to or lower than the initially negotiated rate, or some other fixed rate.

The method of the present invention is particularly useful in gateways. The overproduction of video data is detected in the gateway by periodically observing the amount of data in the incoming buffer. If the amount of data is more than a certain limit for a defined time-period, the endpoint is considered to be overproducing. The data limit for the buffer is preferably set in proportion to the outgoing H.320 video rate.

When overproduction is detected, a new flowControlCOmmand or LogicalChannelRateRequest message is sent to the H.323 endpoint. The bit-rate is then decreased by a constant amount. The time-period for observing a buffer level over the limit should be predefined.

A preferred embodiment of the present invention will now be described referring to the flow sheet of FIG. 1. The data flow of interest is the video data transmitted from a H.323 EndPoint to a H320/H323 Gateway. The Gateway is repacking the payload of the incoming video data to H.320 frames of 10 ms duration being able to carry a constant amount of video data. Thus, at intervals of 10 ms, the video re-packer is asked to produce data to fit into a 10 ms (H.221) frame. A Counter keeps track of the number of data capturing events from the buffer since last time the fill level of the buffer was below a predefined level.

After the re-packer has produced data for a H.221 frame, a buffer_level, indicating the fill level of the video buffer temporarily storing the incoming video data for the EndPoint, is checked. If buffer_level is below a predefined Max_Level, the Counter is reset and the procedure waits for the re-packer to produce new data for another H.221 frame, but if not, the Counter is incremented. In this example, Max_Level is the max amount of video data in a 10 ms H.221 frame.

Then, the Counter itself is investigated, and if it is below a predefined Overprod_Level, the procedure waits for the re-packer to produce new data for another H.221 frame. If not, the H.323 EndPoint is considered to overproduce. The Counter is reset, and the data flow rate of the video data transmitted from the H.323 EndPoint is stepped down by a predefined amount as indicated of the parameter Flow_Step. In this example, Flow_Step is a constant of 16 kbit. The decrementing of the data flow rate is carried out by transmitting a flowControlCOmmand or a LogicalChannelRateRequest message including a maximumBitrate of the current flow rate minus Flow_Step, and a logicalChannelNumber indicating the logical channel of video data. However, before the decrementing takes place, it has to be checked if the current flow rate minus Flow_Step is lower than a predefined Flow_Min. If that is the case, the decrementing is bypassed and the procedure waits for the re-packer to produce new data for another H.221 frame. The reason for this is to make sure that the actual video data rate transmitted from the H.323 EndPoint never is set to zero.

For preventing e.g. data bursts to trigger an oversized reduction of the flow rate, a mechanism intercepting at least the most common events producing data burst should preferably be introduced. As an example, consider the case of a H.323 conference call where the endpoints have different call rates. The endpoint with the lowest call-rate will initially send a flow-control message to the other endpoints to make them produce at the low rate. However, this will not prevent a short period of overproduction. This start burst may trigger the overflow detection mechanism of the present invention to reduce the flow rate more than necessary. To avoid this, the Gateway could be configured to always increase the flow rate to the outgoing H.320 rate a defined time-period after a video-channel is opened.

The present invention handles H.323 endpoints (or endpoints adjusted to similar standards) that produce consistently more video data (or other multimedia data) relative to the flow-control initiated rate.

In other words, the present invention makes a gateway work with consistently overproducing H.323 endpoints preventing buffer overflow and data loss. In this way, build ups of delays and picture artifacts may be avoided or strongly reduced.

The invention is not restricted to flow control between endpoint and gateway only, but may be utilized in an end-to-end context, or between MCU and EndPoint as well. The invention is neither restricted to the H.323 standard, but it could also be useful in connection with other similar standards, e.g. the SIP standard. In case of the SIP standard, the flowControlCOmmand used in the description related to H.323 is replaced with a ReInvite message as described in the background section. The present invention applies for any message or method in future version of the SIP and H.323 standard that is used for flow control.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of adjusting a flow rate of data transmitted from a first packet switched H.323 or SIP configured video conference terminal and received in a H.323/H.320 video conference gateway, the method comprising:
   storing the received data temporarily in one or more buffers in the H.323/H.320 video conference gateway before being captured for further processing;
   after each data capturing from said one or more buffers,
      comparing, at the H.323/H.320 video conference gateway, a fill level of the one or more buffers with a predefined level, wherein said predefined level is equal to a maximum amount of data in a H.320 frame, into which data captured from the one or more buffers is inserted, if said fill level is lower than said predefined level, then resetting a counter,
   if said fill level is greater than said predefined level, then incrementing, at the H.323/H.320 video conference gateway, said counter, and
   comparing, at the H.323/H.320 video conference gateway, said counter with a predefined counter limit,
   if said counter is greater than said predefined counter limit, then
      resetting, at the H.323/H.320 video conference gateway, said counter, and
      decreasing the flow rate of the transmitted data by transmitting, at the H.323/H.320 video conference gateway, a flow control message to the first packet switched terminal instructing the first packet switched terminal to decrease the flow rate according to a flow rate value included in said flow control message.

2. A method according to claim 1, wherein the flow rate is decreased by a predefined constant value.

3. A method according to claim 2, further including the following steps prior to the step of decreasing the flow rate:
   comparing a difference between the flow rate and said predefined constant value with a predefined flow rate limit, and
   carrying out the step of decreasing the flow rate only if said difference is greater that said predefined flow rate limit.

4. A method according to claim 1, wherein said data is video, audio, or other multimedia data transmitted from the first packet switched video conference terminal to a circuit switched terminal via the H.323/H.320 video conference gateway in a video conference.

5. A method of communication comprising:
   temporarily storing, at the H.323/H.320 video conference gateway, data received from a first packet switched H.323 or SIP configured video conference terminal in one or more buffers before being captured for further processing,
   detecting, at a H.323/H.320 video conference gateway, overproduction of data transmitted from the first packet switched H.323 or SIP configured video conference terminal,
   after data capturing from said one or more buffers,
      comparing, at the H.323/H.320 video conference gateway, a fill level of the one or more buffers with a predefined level, wherein said predefined level is equal to a maximum amount of data in a H.320 frame, into which data captured from the one or more buffers is inserted,
   if said fill level is greater than said predefined level,
      then incrementing, at the H.323/H.320 video conference gateway, a counter, and
      comparing said counter with a predefined counter limit, and
      if said counter is greater than said predefined counter limit,
         then resetting said counter, and
         adjusting, at the H.323/H.320 video conference gateway, a flow rate of the transmitted data by transmitting a flow control message from the second to the first packet switched terminal to instruct the first packet switched terminal to decrease the flow rate according to a non-zero flow rate value included in said flow control message.

6. A method according to claim 5, wherein said data is video, audio, or other multimedia data transmitted from the first packet switched video conference terminal to a circuit switched terminal via the H.323/H.320 video conference gateway in a video conference.

7. A method according to claim 5, wherein the flow rate is decreased by a predefined constant value.

8. A method according to claim 7, further including prior to adjusting the flow rate:
   comparing a difference between the flow rate and said predefined constant value with a predefined flow rate limit, and
   carrying out the step of adjusting the flow rate only if said difference is greater that said predefined flow rate limit.

9. The method of claim 1, wherein the counter keeps track of a number of data capturing events from the one or more buffers since a last time the fill level of the one or more buffers was below the predefined threshold.

* * * * *